(12) United States Patent
Andrews (10) Patent No.: US 7,223,043 B1
(45) Date of Patent: May 29, 2007

(54) STRUCTURAL MEMBERS AND JOINING ARRANGEMENTS THEREFOR

(76) Inventor: William Andrews, 19 Lincorn Close, Camrewarra, New South Wales (AU) 2541

( * ) Notice: Subject to any disclaimer, the term of this patent is extended or adjusted under 35 U.S.C. 154(b) by 0 days.

(21) Appl. No.: 09/979,214

(22) PCT Filed: May 22, 2000

(86) PCT No.: PCT/AU00/00500

§ 371 (c)(1),
(2), (4) Date: May 14, 2002

(87) PCT Pub. No.: WO00/71827

PCT Pub. Date: Nov. 30, 2000

(30) Foreign Application Priority Data

May 21, 1999 (AU) .................................. PQ0521

(51) Int. Cl.
*E04B 1/58* (2006.01)
*E04B 1/24* (2006.01)

(52) U.S. Cl. .................. 403/363; 403/230; 403/232.1; 52/241; 52/242; 52/290

(58) Field of Classification Search .................. 52/241, 52/242, 290, 481.1, 481.2, 238.1; 403/230, 403/363, 232.1
See application file for complete search history.

(56) References Cited

U.S. PATENT DOCUMENTS

| | | | | | |
|---|---|---|---|---|---|
| 2,966,708 | A | * | 1/1961 | Freeman, Jr. ............... | 403/230 |
| 3,160,280 | A | * | 12/1964 | Burch .......................... | 52/290 |
| 3,165,815 | A | * | 1/1965 | Wogerbauer ................ | 29/897 |
| 3,217,452 | A | * | 11/1965 | Steele .......................... | 52/242 |
| 3,234,697 | A | * | 2/1966 | Toti et al. ..................... | 52/75 |
| 3,332,197 | A | * | 7/1967 | Hinkle ....................... | 52/731.3 |
| 3,665,837 | A | * | 5/1972 | Balfanz, Jr. ................. | 454/303 |
| 3,845,601 | A | * | 11/1974 | Kostecky ................... | 403/326 |
| 3,861,101 | A | * | 1/1975 | Whisson .................... | 52/238.1 |
| 3,999,875 | A | * | 12/1976 | Simon ........................ | 403/186 |
| 4,018,020 | A | * | 4/1977 | Sauer et al. ................. | 52/241 |

(Continued)

FOREIGN PATENT DOCUMENTS

AU 428738 * 10/1972

(Continued)

OTHER PUBLICATIONS

Alexandros, Karytinos, "Building Frame Construction", European patent Application, Publication No. EP-321,183, Jun. 21, 1989, entire document.*

*Primary Examiner*—Daniel P. Stodola
*Assistant Examiner*—Ernesto Garcia
(74) *Attorney, Agent, or Firm*—Stetina Brunda Garred & Brucker (57) ABSTRACT

A joining arrangement for use in the construction of stud frames and for releasable attachment of a first member to a second structural member forming part of the frame. The first member includes in at least one side wall a female recess which, when the members are joined, engages a corresponding male protrusion in at least one wall of the second member. The respective formations in the first and second members engage such that they are generally in alignment thereby securing the first member to the second member and wherein the first member is a stud and the second member is a plate.

2 Claims, 7 Drawing Sheets

U.S. PATENT DOCUMENTS

| | | | |
|---|---|---|---|
| 4,760,682 A * | 8/1988 | King | 52/731.3 |
| 4,798,029 A * | 1/1989 | Carlton | 403/387 |
| 4,809,476 A * | 3/1989 | Satchell | 52/241 |
| 4,918,899 A * | 4/1990 | Karytinos | 403/230 |
| 5,222,335 A * | 6/1993 | Petrecca | 403/230 |
| 5,394,665 A * | 3/1995 | Johnson | 52/481.1 |
| 5,592,796 A * | 1/1997 | Landers | 52/241 |
| 5,649,688 A * | 7/1997 | Baker | 256/22 |
| 5,685,121 A * | 11/1997 | DeFrancesco et al. | 52/241 |
| 6,374,558 B1 * | 4/2002 | Surowiecki | 52/241 |
| 6,568,138 B1 * | 5/2003 | Frost et al. | 52/241 |

FOREIGN PATENT DOCUMENTS

| | | | |
|---|---|---|---|
| AU | 494278 | * | 7/1978 |
| AU | 14070/92 | * | 10/1992 |
| AU | 702437 B | * | 2/1999 |
| EP | 676513 A1 | * | 10/1995 |
| JP | 52-101819 A | * | 8/1977 |
| JP | 09268701 A | * | 10/1997 |
| WO | WO 8810344 A1 | * | 12/1988 |

* cited by examiner

STRUCTURAL MEMBERS AND JOINING ARRANGEMENTS THEREFOR

BACKGROUND

The present invention relates to joining systems and to structural members for use in such joining systems. More particularly, the present invention relates to structural members for use in releasable joining arrangements formed by such structural members whereby an end of a first structural member includes a formation which may be joined by engagement with a corresponding formation on a second structural member such that the members may be joined at any location along the length of the second member and without the need for fasteners. Although the present invention in all its forms has multiple applications, the invention will be primarily described with reference to its application in joining structural members for use in particular thought not exclusively in stud frames.

PRIOR ART

Traditionally, light weight construction of metal stud frames employs steel or aluminium stud members which are generally channel shaped and wherein the ends of the stud members engage channel shaped plate members. A standard form metal stud frame will usually comprise a series of spaced a part stud members which each engage via their ends respective opposing top and bottom plate members. According to conventional methodology, the frames are generally assembled on the ground. Typical frame construction involves placement of top and bottom plate members in spaced apart opposing relationship whereupon stud members are connected to the top and bottom plates which traditionally involves engaging the ends of the studs with tech screws or the like. These frames may or may not be braced but in the case where they are not braced with bracing members reliance for bracing is placed on tech screws. Unlike external frames, internal frames used in partitioning are not generally braced during construction as bracing is effected by wall cladding fixed to the frame. During construction, stud frames are structurally weak and in the case of internal frames, they are not effectively braced until the wall cladding is affixed to the frame. A small number of holding screws may be used to fix some studs to the top and bottom plates. Although a weak form of bracing is created by the conjunction between stud and plate members which are screwed no reliance can be placed on the bracing of the frame as the unscrewed joins do not offer sufficient strength and resistance against slewing in the circumstance when the frame is lifted into position.

Installers screw the members together at the point of overlap between stud and plate but engagement of studs to plates with limited screwing will not of itself provide adequate bracing. The profiles of the known studs and plates are channel shaped with a planar base and sidewalls extending from and continuous with the edges of said base. Typically, a stud mates with a plate by insertion of the end of the stud into the throat of the plate. The fit is essentially friction grip and there is no resistance against separation of stud from plate until such time as tech screws are inserted.

Another method of affixation of studs to top and bottom plates involves a tab and slot arrangement in which tabs located at the extremity of the walls of the top and bottom plates engage a corresponding slot in each wall of the stud members following which the tradesman hammers the tabs so they are orientated at an angle other than normal to the walls of the stud members thereby locking the stud members against the top and bottom plates.

One disadvantage of this method is that more material is required to form the channel shaped top and bottom plates. Secondly, additional labour is required to bend the tabs into their locking position which can be awkward due to the position of the protruding tabs inside the channel shaped studs. Although the tab and slot method of connection of studs to plates is effective in securing the members, it is tedious and time consuming for tradesman to bend the tabs four times for each stud. The insertion of tech screws, although used in holding studs to plates during construction and until the cladding material is affixed to the stud frame is likewise time consuming and does not provide effective temporary bracing until all or the majority of joins are screwed. Other methods of affixation of studs to plates have been used such as riveting, welding or clinching each of each stud, all of which methods involve additional labour.

A further prior art method of joining structural members for a stud frame involves the use of cooperating and corresponding engaging formations in the walls of both the stud and plates. The formations in the plate consist of a securing notched formed in the walls of the mating stud and plates. To facilitate stud location, the wall extremities of the plate are abbreviated by upturning of a lip formed at the extremities at the position where the stud mates with the plate. The additional material required to form the lip adds to material costs and necessitates a securing clip which adds to costs in labour and assembly. Another disadvantage of this mode of connection is that the surface area of engagement is low resulting in low resisitance to relative rotation, twisting, and pulling out between stud and plate.

Another problem with this arrangement lies in the alignment between stud and plate formations requiring some squeezing and manipulation of the stud by the assembler to secure it in position which adds to assembly time and therefore labour costs.

Another prior art method involves the engagement between a formation in the walls of the top and bottom plates and a corresponding formation in stud members. The formations are produced by pressing out of a region of the wall of each member so that the formations mate in snap fit male/female relationship. While this system works well it necessitates an additional punching step during production which increases production time of the constituent structural members but it does provide a useful and more convenient alternative to the tab system described above. All of the above systems rely on pre punching and limits or removes entirely the ability of the installer to move the studs relative to plates once fitted and where adjustment may be required during construction to accommodate fit and finish errors or window or door size irregularities.

Another problem arising particularly in internal stud frame construction is irregularity in floor to ceiling height in buildings caused by poor concrete finishing and out of alignments which often neccessitates cutting of stud members in regions of reduced height. In a normal stud frame, the stud members would be the same height or length but where there are irregularities in the ceiling or floor, the frame will not fit unless stud heights are suitably cut to accommodate those differences. This is time consuming and adds additional labour costs to the installation.

INVENTION

The present invention seeks to ameliorate the shortcomings of the prior art arrangements, by providing an alternative method of joining structural members used in the formation of metal stud frames and the like for use in modular construction of stud frames. Preferably the arrangements are adapted to suit internal non load bearing stud frame partitioning. Due to the labour and additional material costs in implementation of the known methods, there is a need to provide a joining system which allows quick and efficient joining of structural members of a stud wall frame without having to use any tools such as a hammer as previously described and allowing quick, efficient and infinite positioning of the stud. The joining arrangements according to the present invention further allows convenient, releasable fixation of a stud to a plate without any further operation to secure the members after initial joining. The joining arrangements obviate the need for additional bracing once the frame is assembled and have the advantage that each stud/plate join is effectively braced due to the interengagement of profiled parts formed in the studs and plates.

The present invention also provides a stud member including an adjustable extension member which enables the length of the stud to be adjusted to accommodate on site height variations avoiding the need for installers to cut studs to accommodate misalignment.

In another broad form, the present invention comprises: a joining arrangement for use in the construction of stud frames wherein a first structural member is releasably attached to a second structural member, wherein, said first member has side walls which include a formation which when members are to be joined, engages a corresponding formation on the second member, characterised in that the formation in the side walls of said first member is disposed at an angle to its longitudinal axis and the formation on said second member is disposed generally parallel to its longitudinal axis such that upon engagement of the first and second members, the respective formations in said first and second members engage, such that they are generally in alignment.

In another broad form the present invention comprises: a joining arrangement for use in the construction of stud frames and for releasable attachment of a first member to a second structural member forming part of said stud frame, wherein, said first member includes in at least one side wall a formation which, when members are to be joined, engages a corresponding formation in at least one wall of the second member, characterised in that the formation in said wall/s of said first member is/are disposed at an angle to the longitudinal axis of the member and the formation in said second member is disposed generally parallel to its longitudinal axis such that upon press fitting engagement of the first and second members, the respective formations in said first and second members engage to secure the first member to the second member. According to a preferred embodiment, the respective formations in each said first and second members allow relative movement between the first and second members in the direction of the longitudinal axis of the second member. Preferably the joining arrangement is used in the construction of internal stud frames in such applications as partitioning.

In another broad form the present invention comprises;
a joining arrangement enabling releasable attachment of first and second structural members used in the construction of a stud frame, wherein the joining arrangement comprises a formation in the first member disposed at an angle to the longitudinal axis of the member and which engages a corresponding formation in the second member which is disposed generally in alignment with the longitudinal axis of the second member such that the respective formations in said first and second members cooperate to releasably attach the first member to the second member; wherein the joining arrangement allows relative movement between the first and second members.

According to a preferred embodiment, the relative movement enables movement of the first member along a direction parallel to the longitudinal axis of the second member.

In another broad form the present invention comprises; a joining arrangement for joining structural members for use in construction of a stud frame wherein the arrangement comprises:

a formation in opposing walls of the first member which engages a corresponding formation in opposing walls of the second member; wherein the formation in the walls of the first member are disposed normally to the longitudinal axis of the member and the formation in the walls of the second member are disposed in alignment with the longitudinal axis of the second member such that the respective formations in the first and second members upon engagement align and allow the first member freedom of movement relative to and in the direction of the longitudinal axis of the second member.

According to the preferred embodiment, the first member is rotated into its position of engagement with the second member and can be released by rotation in the opposite direction. Preferably the formations in the first and second members comprise inwardly directed recesses which interfit in male/female engagement.

In another form the present invention comprises: a structural member for use in a stud frame and which joins with top and bottom plates of the stud frame; characterised in that the member is a stud which includes an extension element capable of relative movement thereby allowing adjustment to the length of the stud to accommodate floor to ceiling height variations.

Preferably, the adjustment is telescopic wherein the extension member may be extended and retracted to adjust the length of the member to suit floor to ceiling height.

The ends of the elements may be adapted with any of the forgoing joining systems herein described but ideally would include an extension member which allows for relative longitudinal movement of a first member relative to a second member.

In its broadest form of the method aspect the present invention comprises; a structural member for use in a building structure such as a stud frame, wherein the member comprises at least a web and sidewalls depending from said web; characterised in that the structural member further includes a formation in at least one said walls engages a corresponding formation in at least a second mating structural member to releasably secure said structural member to said mating member.

Preferably, the formations are disposed either parallel or normal to the longitudinal axis of said structural member and comprise a recess in the external face of said at least one wall and a projection on an inside face of said at least one wall wherein the internal projection is formed by the external recess.

Preferably each said walls of said structural member have at least one said formations which are the same length as one dimension of said walls. According to one embodiment the formations are parallel to the longitudinal axis of the structural member. Preferably the formations are located proximate said web and on opposing faces of said walls with each at the same distance from the web.

According to one embodiment the formations are normal to the longitudinal axis of said structural member and are located at or near one or both ends of said structural member. Preferably, when the formations are parallel to the longitudinal axis of said member, the member is capable of mating with a mating member with formations which are normal to the longitudinal axis of said member, such that the members are detachably fixed to each other. According to a preferred embodiment the structural member is telescopic and includes an outer member and an inner member wherein the members move relative to each other such that one of the members moves between a retracted state in which it is nested in the other member and and an extended state in which said member is partially or fully extended relative to said other member. Preferably, one of said members is an extension member which includes a formation which is capable of engaging a mating member. The extension member is preferably substantially shorter than said other member.

In another broad form according to the method aspect the present invention comprises: a method of construction of a stud frame using structural members each comprising at least a web and sidewalls depending from said web; characterised in that the members include a formation in at least one said walls of a first of said members which engages a corresponding formation in a second member to secure said structural member to said mating member; the method comprising the steps of:

a) taking the first said structural member including a formation in at least one said sidewalls;

b) taking the second structural member the same or similar to said first structural member;

c) taking a third structural member and setting it in opposing relationship to said first member;

d) taking the second structural member including a formation in at least one wall of said member and which is normal to the longitudinal axis of said second member;

e) placing a first end of said second member into engagement with said first member and a second end of said second member into engagement with said third member such that respective formations on said first and second and said third and second members mutually engage to hold said members in detachable engagement;

f) taking a fourth and subsequent members and joining a first end of said fourth and subsequent members with said first structural member g) engaging a second end of said fourth and subsequent members with said third structural member;

Preferably the method includes the further steps of repeating steps f) and g) until a stud frame of predetermined length is formed.

Preferably, the method includes the further step prior to engagement of any one or more of said fourth and subsequent members, of telescopically extending the length of one or more said, fourth and subsequent members to accommodate height variations in a space defined by said first and third members. Preferably, said first and second ends of said, fourth and subsequent members are positively rotated into into snap fit engagement with said first and third members.

In another embodiment of the invention, a system for interconnecting and framing studs consists of a first longitudinal structural bottom member, at least one second longitudinal structural member, and a third longitudinal structural top member.

The first longitudinal structural bottom member may be adapted to be positioned atop a surface in a generally horizontal orientation. The first bottom member may have a channel-shaped cross-section and a first pair of terminus ends. The first bottom member may further consist of a lower horizontally oriented and substantially flat planar web side, a first pair of opposing, parallel, longitudinal and inwardly directed male protrusions, and a first pair of opposing, parallel, longitudinal, substantially flat and vertically oriented side walls.

The lower horizontally oriented and substantially flat planar web side may be defined by a first pair of opposing, parallel and longitudinal edges which are each of a prescribed length and a first pair of opposing terminus edges.

The first pair of opposing, parallel, longitudinal and inwardly directed male protrusions may be continuously formed along the lengths of respective ones of the first pair of opposing, parallel and longitudinal edges. Each protrusion may have a V-shaped cross-section and consisting of a first lower inclined side integrally connected to a first upper inclined side along a common longitudinal edge to form a respective one of said inwardly directed male protrusions. The first lower inclined side being positioned proximal to and integrally connected to a respective one of said first pair of opposing, parallel, and longitudinal edges of the lower planar web side.

The first pair of opposing, parallel, longitudinal, substantially flat and vertically oriented side walls may each be integrally connected to a respective first upper inclined side of a respective one of said inwardly directed male protrusions.

The at least one second longitudinal structural member may be adapted to be transversely interconnected to said first bottom member in a generally vertical and perpendicular orientation with respect to said first bottom member. The at least one second member may have a channel-shaped cross-section and a second pair of terminus ends. The at least one second member may further consist of a telescopic feature, a vertically oriented and substantially flat planar web side, a second pair of opposing, parallel, longitudinally, substantially flat and vertically oriented side walls, a pair of longitudinal and vertically oriented and substantially flat planar flanges, and at least one opening disposed through said vertically oriented planar web side for receiving conduits.

the telescopic feature consists of an inner longitudinal element and outer longitudinal element. The inner element being adapted to closely interfit within and interface with said outer element such that said inner element is adapted to slidably move within said outer element.

The vertically oriented and substantially flat planar web side may be defined by a second pair of opposing, parallel, longitudinal and vertically oriented edges, and a second pair of horizontally oriented opposing terminus edges.

Each wall of the second pair of opposing, parallel, longitudinal, substantially flat and vertically oriented side walls is integrally connected to a respective one of said second pair of opposing vertically oriented edges of said vertically oriented planar web side. Each of said second pair of vertical side walls being further defined by a distal, longitudinal and vertically oriented edge. A first pair of horizontally oriented opposing side edges which are each of a prescribed length and connect to a respective one of said second pair of horizontally oriented opposing terminus edges in a perpendicular manner.

Each flange of the pair of longitudinal and vertically oriented and substantially flat planar flanges is integrally connected to a respective one of said distal, longitudinal and vertically oriented edge of said second pair of vertically oriented side walls such that each flange is coplanar with each other and opposes said vertically oriented planar web side in a parallel manner.

Each of said second pair of terminus ends of said at least one second member includes a pair of opposing, parallel and inwardly directed female recesses continuously formed along the lengths of respective ones of said first pair of horizontally oriented opposing side edges. Each recess has a V-shaped cross-section adapted to receive a respective one of said inwardly directed male protrusions disposed on said first bottom member. Each of said pair of female recesses is positioned in a horizontal and perpendicular orientation with respect to said vertically oriented web side. Each female recess comprises an outer distal inclined side integrally connected to an inner inclined side about a common horizontally oriented side edge to from a respective one of said inwardly directed female of recesses. The outer distal inclined side is integrally formed therewith a respective one of said first pair of horizontally oriented opposing side edges defined by said second pair of opposing vertically oriented side walls.

The third longitudinal structural top member is adapted to be positioned atop the other of said second pair of terminus ends of said at least one second structural member in a generally horizontal orientation. The third upper member has a generally channel-shaped cross-section and a third pair of terminus ends. The third bottom member further consists of an upper horizontally oriented and substantially flat planar web side, a second pair of opposing, parallel, longitudinal and inwardly directed male protrusions, and a third pair of opposing, parallel, longitudinal, substantially flat and vertically oriented side walls.

The upper horizontally oriented and substantially flat planar web side is defined by a third pair of opposing, parallel and longitudinal edges which are each of a prescribed length and a third pair of opposing terminus edges.

The second pair of opposing, parallel, longitudinal and inwardly directed male protrusions is continuously formed along the lengths of respective ones of the third pair of opposing, parallel longitudinal edges. Each protrusion has a V-shaped cross-section and consists of a second upper inclined side integrally connected to a second lower inclined side along a common longitudinal edge to form a respective one of said inwardly directed male protrusions. The second upper inclined side being positioned proximal to and integrally connected to a respective one of said opposing, parallel, and longitudinal edges of said upper planar web side.

Each wall of the third pair of opposing, parallel, longitudinal, substantially flat and vertically oriented side walls which is integrally connected to a respective second lower inclined side of a respective one of said inwardly directed male protrusions.

A lower one of said second pair of terminus ends of said at least one second structural member is adapted to be interconnected within said first structural bottom member by inserting said lower one of said second pair of terminus ends into an open ended side of said first structural bottom member and twisting said lower one of said second pair of terminus ends of said at least one second structural member until said pair of inwardly directed male protrusions of said first structural member are received, aligned and interconnected with a respective one of said pair of inwardly directed female recesses of said second structural member to form a perpendicularly interconnected structural framing joint between said first bottom member and said at least one second structural member.

An upper one of said second pair of terminus ends of said at least one second structural member is adapted to be interconnected within said third structural top member by inserting said upper one of said second pair of terminus ends into an open ended side of said third structural top member and twisting said upper one of said second pair of terminus ends of said at least one second structural member until said pair of inwardly directed male protrusions of said third structural member are received, aligned and interconnected with a respective one of said pair of inwardly directed female recesses of said second structural member to form a perpendicularly interconnected structural framing joint between said third top member said at least one second structural member.

The telescopic feature is adapted to allow said at least one second structural member to be either lengthened or shortened in the longitudinal and vertical direction to accommodate floor to ceiling height misalignment.

In another embodiment, each V-shaped protrusion may be shaped by retaining first portion of the plate wall that extends inward from said longitudinal edge of the plate web toward the opposing wall at an acute angle to the plate web. The longitudinal edge may be in a common plate to the plate wall. A second portion of the plate wall that extends from the first portion of the plate wall to a third portion of plate wall may be perpendicular to the plate web. The second portion of the plate wall may have an obtuse angle to the third portion of the plate wall for engagement with a retainable portion of a stud wall of the stud member.

The stud wall may include V-shaped recesses at a first end of the stud wall. The V-shaped recesses may be disposed generally normal to a longitudinal axis of the stud wall for engagement with corresponding V-shaped protrusions in the opposing walls of the metal plate member.

Each V-shaped recess may be shaped by a retainable first portion of the stud wall that extends inward from the first end of the stud wall toward the opposing stud wall at an acute angle to the longitudinal axis of the stud wall. A second portion of the stud wall may extends from the first portion of the stud wall to a third portion of the stud wall that is perpendicular to the stud web. The second portion of the stud wall may be at an obtuse angle to the third portion of the stud wall for engagement with the first retaining portion of said plate wall of the metal late member.

DETAILED DESCRIPTION

The present invention will not be described according to preferred but non limiting embodiments and with reference to the accompanying illustrations wherein.

Figure 1:
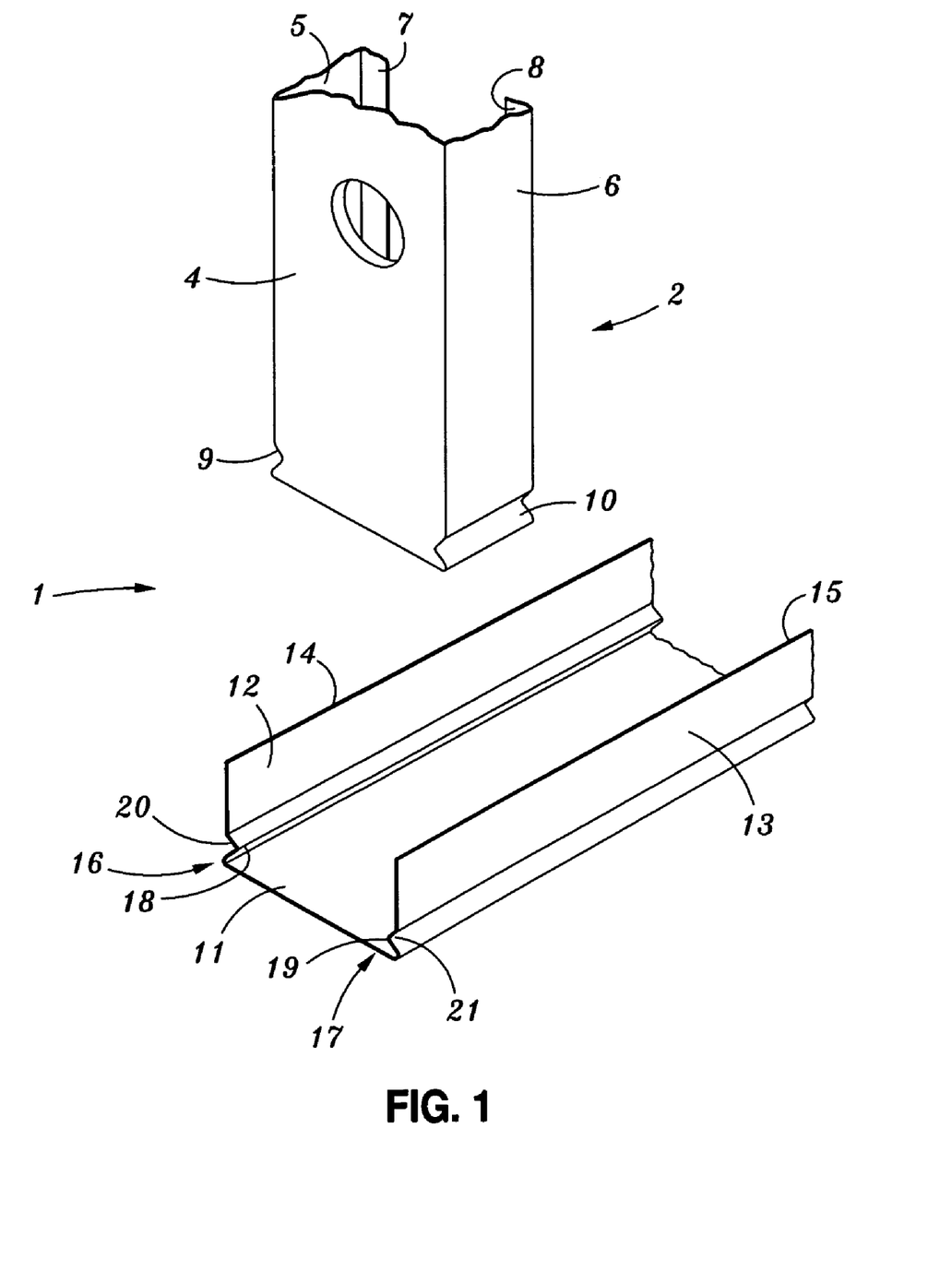
FIG. 1 shows an exploded view of a joining arrangement for two structural members including respective formations in the walls of the members according to a preferred embodiment of the invention.

Referring to FIG. 1 there is shown an exploded view of an assembly 1 for joining two structural members 2 and 3 according to a preferred embodiment of the invention. Structural member 2 is preferably channel shaped and includes a web 4 to which is connected opposing walls 5 and 6 which terminate in respective flanges 7 and 8.

Wall members 5 and 6 have formed therein respective V-shaped formations 9 and 10 which each define inwardly directed recesses. Formations 9 and 10 may be introduced into member 2 by means of a roll forming step during production of member 2. Member 2 is preferably employed as a stud for use in metal frame construction and is adapted for releasable attachment to member 3 which acts as either a top or bottom plate in a metal stud frame. Member 3 is generally channel shaped and includes web 11 to which is connected opposing walls 12 and 13 which terminate in free ends 14 and 15. Walla 12 and 13 include formations 16 and 17 defining respective inwardly directed male V-shaped protrusions 18 and 19 and external female V-shaped recesses 20 and 21. Although respective formations 9, 10 and 16 and 17 are inwardly directed, it will be appreciated by those skilled in the art that the formations may be reversed such that the protrusions would be projected outwardly relative to the walls in which they are formed.

Figure 2:
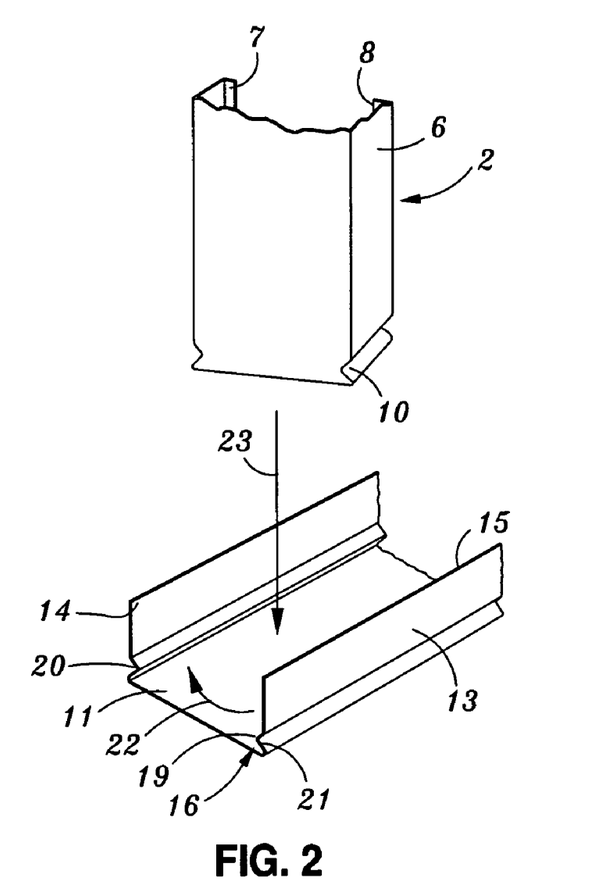
FIG. 2 shows a perspective view of respective ends of a typical stud and plate according to one embodiment of the invention prior to engagement.
Figure 3:
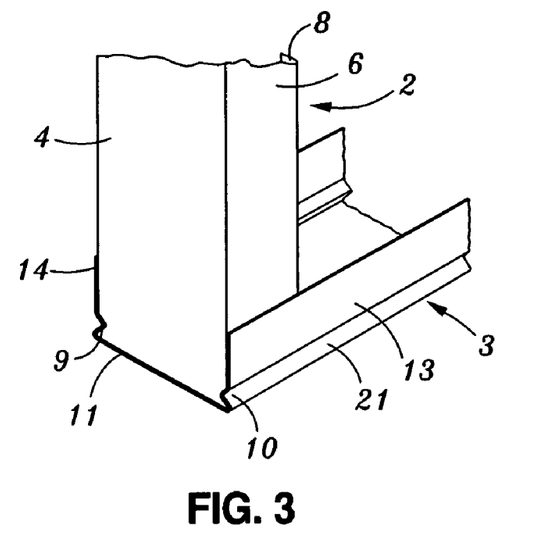
FIG. 3 shows an assembled view of the arrangement in FIGS. 1 and 2.

Referring to FIG. 2 there is shown the stud and plate arrangement of FIG. 1 showing the rotation of a stud 2 relative to plate 3 prior to mutual engagement thereof. The arrangement shown is typical of engagement between a stud and bottom plate. Engagement takes place by rotation of stud 2 in the general direction of arrow 22 to allow stud 2 to be urged into position by press fit in the direction of arrow 23. FIG. 3 shows the final engagement of stud 2 and plate 3. The arrangement shown in FIG. 3 is the typical engagement which would occur at locations 24 and 25 of frame 26 shown in FIG. 4.

On site, stud frames are generally assembled on the floor according to engineering plans which indicate to the assembler the positions of the stud members. The positions of the studs are critical to ensure elimination of cumulative error along the length of the frames, even spacing and to allow for locations of doors and windows. Location of the stud members is also critical to ensure that frame members match the location of joins in cladding affixed to the frames to ensure that the cladding joins are rigidly supported. Where the top and bottom plates of a stud frame are prefabricated with formations which dictate the exact location of the studs there is no inherent flexibility in the positioning of the studs to accommodate misalignment of a cladding join with a stud. Correcting stud location for this misalignment is difficult if not impossible with the tab and slot joining systems and also with the existing systems employing corresponding formations pressed into the walls of the plate and stud members as relative movement between stud and plate is not available once the members are fitted.

According to the invention the joining arrangement allows for the relative movement between stud members and top and bottom plate members to adjust for any misalignments between cladding and studs and where fine adjustments may be required to accommodate windows and doors. This is achieved by means of a snap fit connection between stud and plate which provides a strong connection yet allowing relative movement between stud and plate members so the stud may be relocated at any position along the length of the plate members. The formation in the walls of the stud may travel the full length of the member or they may be intermittent. In the latter case, the studs will be adjustable along the length of the plate over the full length of the formation. With this choice for the formation, the movement flexibility of the studs relative to the plates will either be absolute along the full length of the plate or over a predetermined distance in the stud location. In the latter case the formation in the walls of the plate will occur over a short distance in the region of a predetermined stud position.

Figure 4:
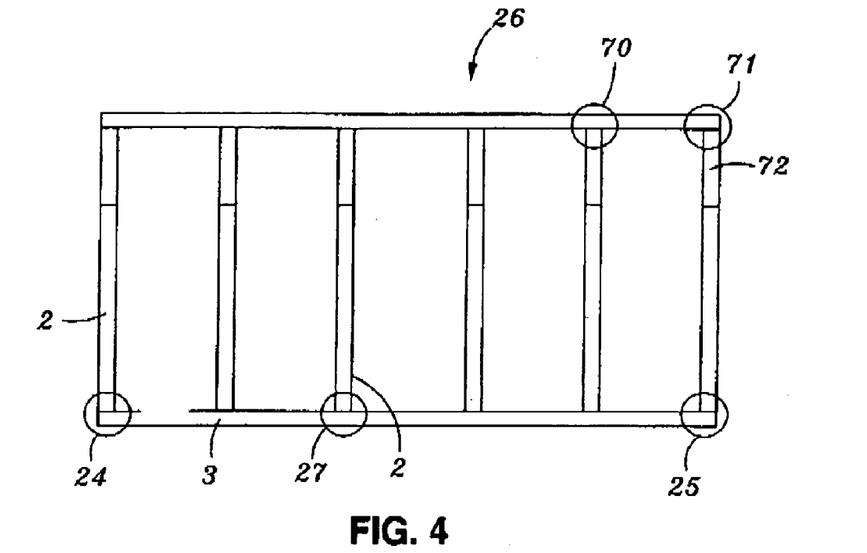
FIG. 4 shows an elevation view of a typical stud and plate frame according to a preferred embodiment of the invention.
Figure 5:
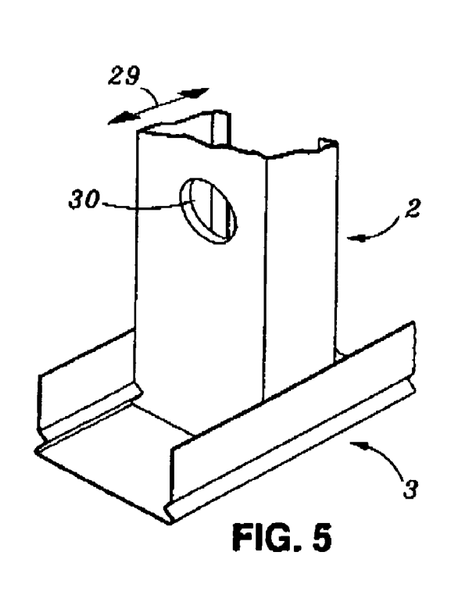
FIG. 5 shows a perspective view of an engagement between an intermediate stud and bottom plate in the frame of FIG. 4.

FIG. 5 shows a perspective view of a typical intermediate joint 27 of the frame 26 of FIG. 4 in which intermediate stud engages plate 3. Stud 2 is able to move longitudinally along plate 3 in the direction of arrow 29, thereby allowing fine adjustments to the position of stud 2 to accommodate stud spacing requirements, joins in cladding or positions of windows or doors.

Figure 6:
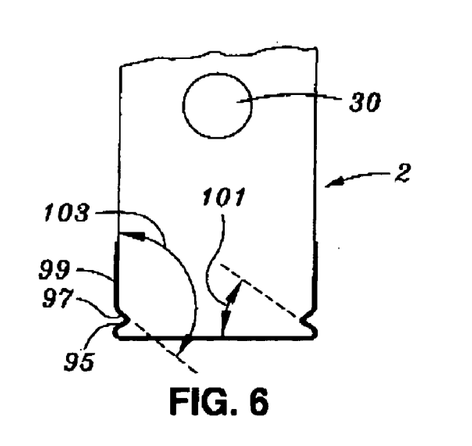
FIG. 6 shows an end view of the arrangment of FIG. 5.

FIG. 6 shows an end view of the arrangement of FIG. 5 and the nature of the mating engagement between stud 2 and plate 3. According to one embodiment stud 2 includes an optional opening 30 formed therein which accommodates material such as but no limited to service conduits. A common problem which exists in frame installation is ceiling to height irregularities in buildings. This may occur where concrete finishing is uneven creating fit problems for stud frames. According to present methodology this problem is addressed by cutting individual studs to fit the distance between bottom and op plates. This is time consuming during construction of frames and adds to labour costs. This problem is overcome according to one aspect of the present invention by providing an extendible stud which eliminates the need for cutting to suit ceiling to height irregularities. According to one embodiment there is provided an optional telescopic stud which includes an extension member which moves between a retracted state in which the stud is a first minimum length and an extended state in which the stud is extended from the minimum length up to a maximum length.

Figure 7:
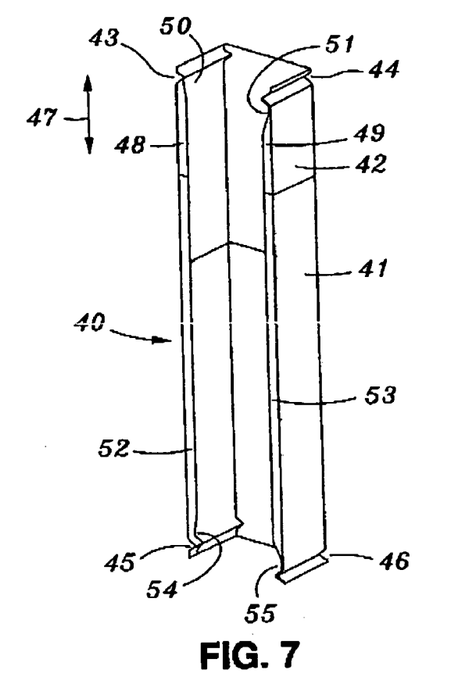
FIG. 7 shows an isometric view of a telescopic stud member according to a preferred embodiment of the invention.

FIG. 7 shows an isometric view of a structural member 40 according to a preferred embodiment including telescopic elements 41 and 42 which enable extension and retraction to a predetermined distance. Elements 41 and 42 are channel shaped and are arranged such that element 42 fits inside a channel formed by element 41.

In the event of floor to ceiling height misalignment in a structure to which a stud frame is to be fitted, member 40, due to its telescopic extension capability eliminates the need for on site measuring and cutting where studs are found to be too long or too short. This reduces on site time and labour costs.

According to the embodiment shown in FIG. 7, element 42 includes formations 43 and 44 and element 41 includes formations 45 and 46. These mate with corresponding top and bottom plate members according to the arrangements previously described allowing longitudinal adjustment relative to the plates in addition to vertical adjustment in the direction of arrow 47. During the cold forming of element 42, flanges 48 and 49 are crushed at regions 50 and 51 as formations 43 and 44 are introduced into element 42. Likewise flanges 52 and 53 are crushed in the regions of 54 and 55 as formations 45 and 46 are introduced into element 41.

Figure 8:
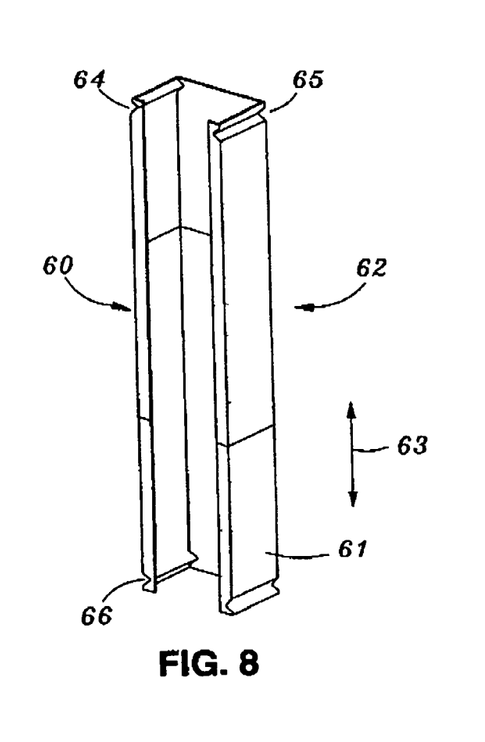
FIG. 8 shows a isometric view of a telescopic stud member according to an alternative embodiment.

FIG. 8 shows a telescopic stud element 60 according to an alternative embodiment. Stud 60 comprises elements 61 and 62 which are capable of telescopic adjustment in the direction of the arrow 63. Stud 60 further comprises in element 62, formations 64 and 65 which engage corresponding formations in a plate in a manner previously described. Likewise element 61 comprises formations 66 and 67 which will engage a bottom plate as previously described.

Figure 9:
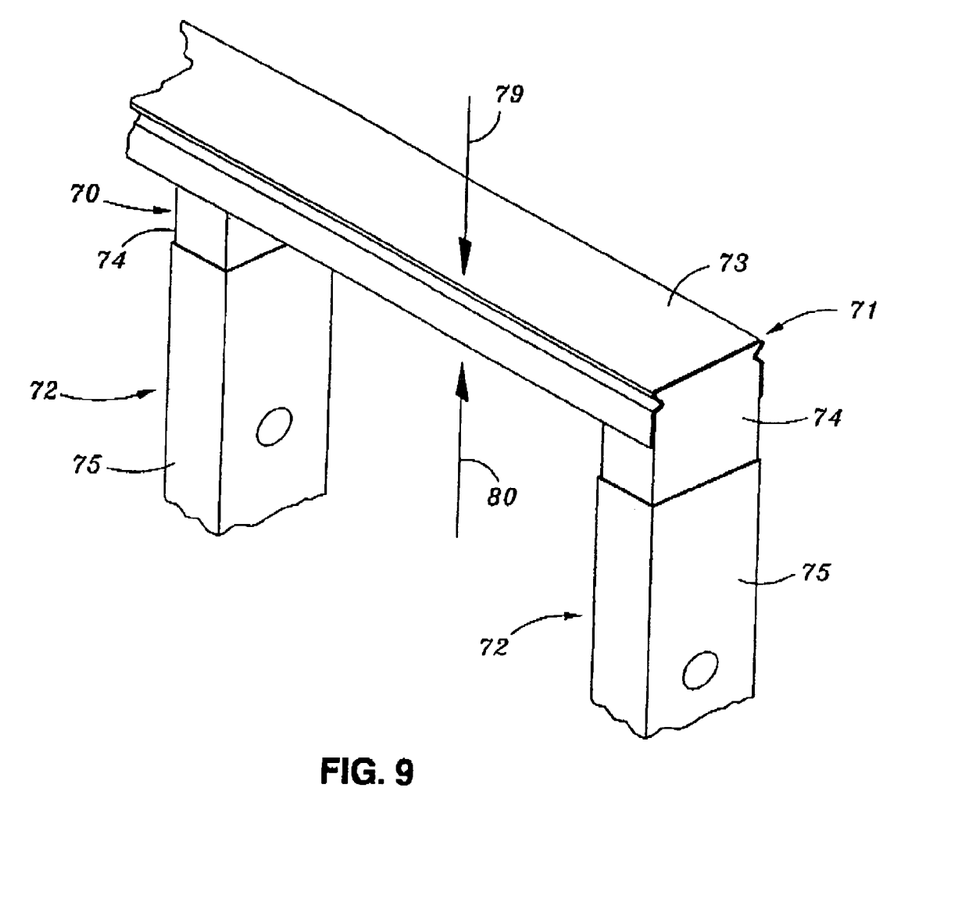
FIG. 9 shows an abbreviated perspective section of a stud frame showing mating between telescopic studs and plate according to a preferred embodiment of the invention.
Figure 10:
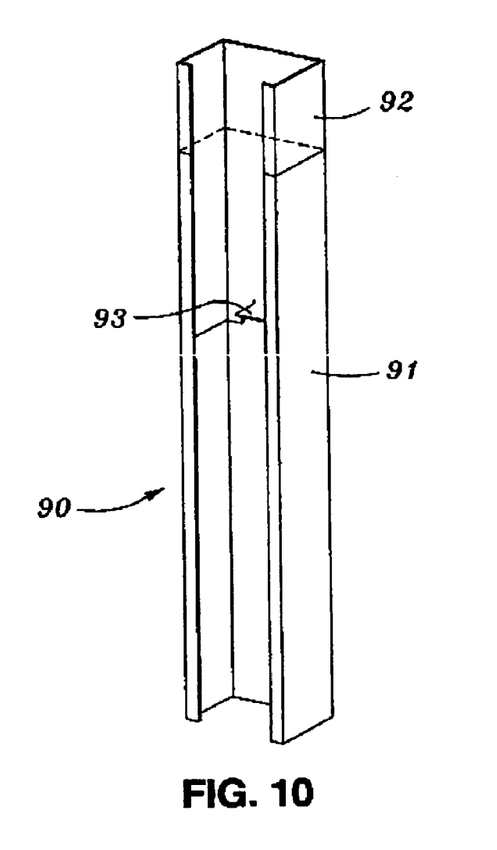
FIG. 10 shows an isometric view of a stud member according to an alternative embodiment.
Figure 10A:
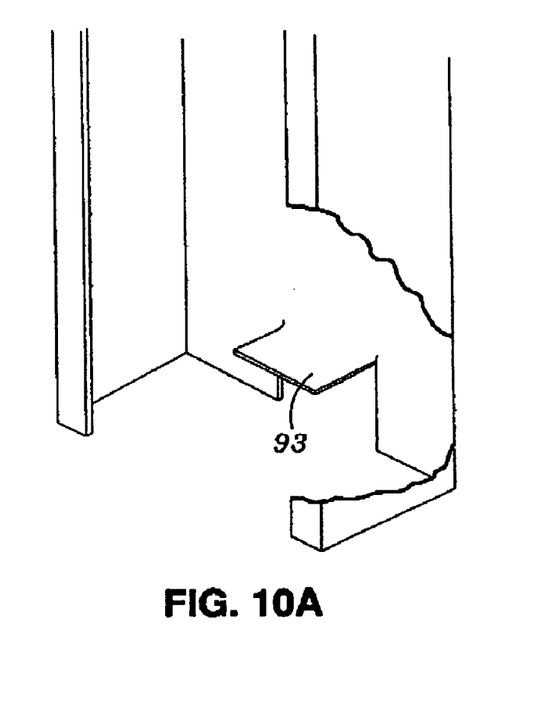
FIG. 10A shows a close up view of the stud member of FIG. 10.

FIG. 9 shows a section of the frame of FIG. 4 defined by line X—X and includes junction 70 and end junction 71. Junction 71 is formed by mating of outer telescopic stud 72 and top plate 73. Outer telescopic stud 72 may comprise first telescopic element 74 and second telescopic element 75. The outer telescopic stud 72 may extend to increase the local height of the frame. Likewise, intermediate stud 72 which may also comprise elements 74 and 75 may also extend in which case that portion of the frame can be extended or retracted in the direction of arrows to accommodate height variations. FIG. 10 shows an alternative stud 90 comprising telescopic elements 91 and 92. This is a more conventional stud profile without formations in the ends of elements 91 and 92 to engage with corresponding plate profiles as previously described. Element 92 includes a tab 93 (see FIGS. 10 and 10A) which provides a bearing shoulder for urging element 92 in a direction of arrow 94 to accommodate height variations.

Figure 11:
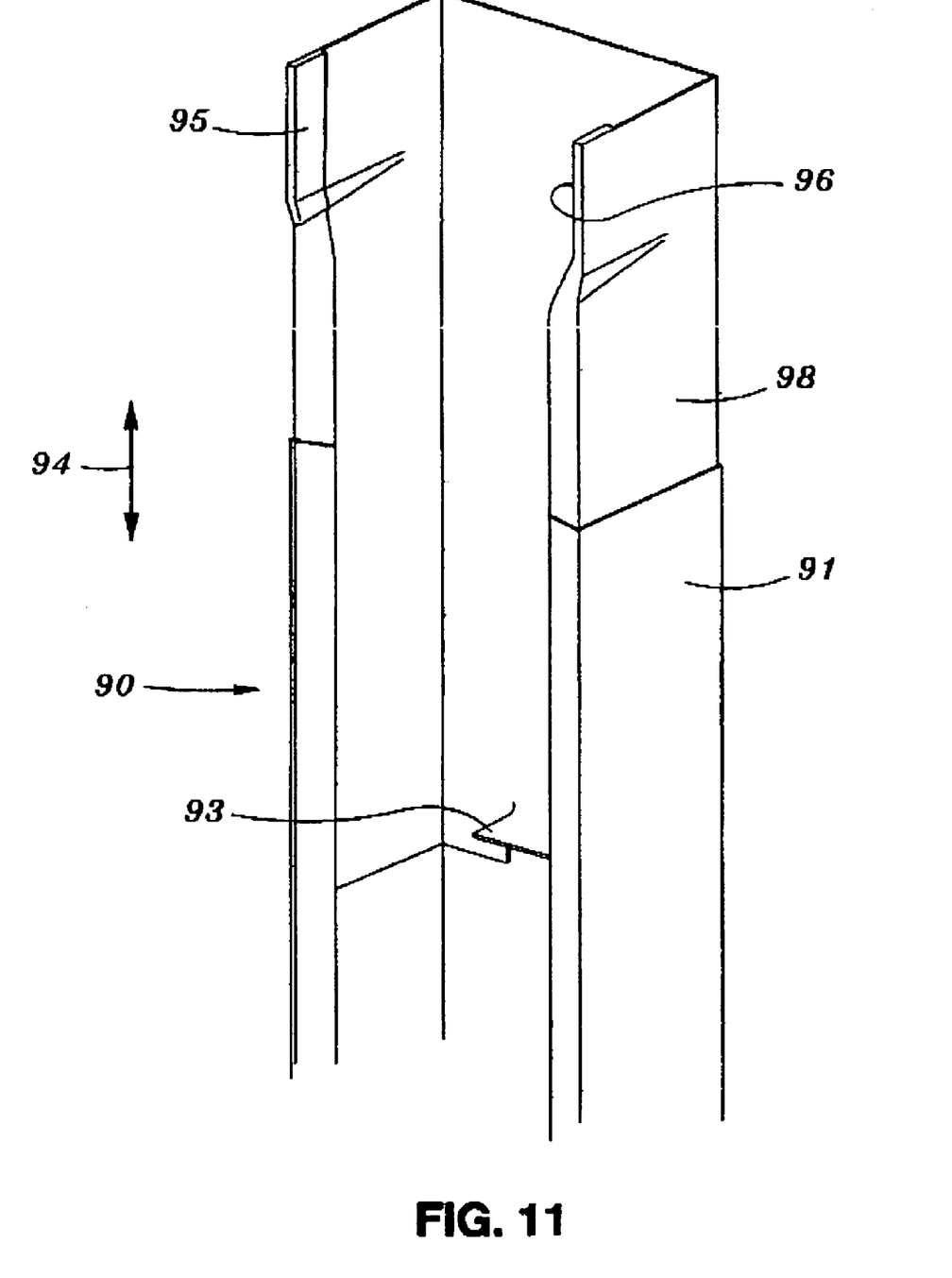
FIG. 11 shows an isometric view of a stud member including an extension member with a flared end for biased engagement with a plate.

FIG. 11 shows stud 90 of FIG. 10 including flared ends on element 98. This arrangement allows element 98 to engage a top plate with a positive bias thereby increasing frictional fit between stud and plate. This arrangement can also be introduced into the end of element 91 which would engage a bottom plate.

One major advantage of the joining arrangement using the formations described is that the formations in the plate members are fabricated during the rolling phase without any steps additional to those already involved in the manufacture of the plates. The formation in the studs require an additional forming step but when the system is used in the filed additional labour steps such as turning down tabs are eliminated rendering the invention more economic than the known methods.

In an aspect of the wall frame, referring to FIG. 6, the structural member 3 may comprise opposing plate walls. Each of the plate walls may comprise first portion 95, second portion 97 and third portion 99. The first and second portions 95, 97 may define the formations 9 and 10. Additionally, the first portion and the plate web 11 may be at an acute angle 101 with respect to each other. Also, the second and third portions 97, 99 may be at an obtuse angle 103 with respect to each other.

It will be recognised by persons skilled in the art that numerous variations and modifications may be made to the invention as broadly described herein without departing from the overall spiritand scope of the invention.

The claims defining the invention are as follows:

1. A metal plate member in combination with a metal stud member, comprising: a plate web; and a pair of opposing plate walls connected to longitudinal edges of the plate web;

wherein the plate walls include V-shaped protrusions disposed generally parallel to a longitudinal axis of the plate walls for engagement with corresponding V-shaped recesses in opposing stud walls of the metal stud member; and wherein each V-shaped protrusion is shaped by a retaining first portion of the plate wall that initiates juxtaposed the plate web and extends inward from said longitudinal edge of the plate web toward the opposing plate wall at an acute angle to the plate web, and a second portion of the plate wall extends from the first portion of the plate wall to a third portion of the plate wall which is perpendicular to the plate web, the second portion of the plate wall being at an obtuse angle to the third portion of the plate wall for engagement with a retaining portion of a stud wall of the metal stud member;

the metal stud member comprising:

a stud web with the opposing stud walls connected to the stub web;

wherein the V-shaped recesses of the stud walls are at ends of the stud walls, the V-shaped recesses being disposed generally normal to a longitudinal axis of the stud walls for engagement with corresponding V-shaped protrusions in the opposing plate walls of the metal plate member; and wherein each V-shaped recess is shaped by a retainable first portion of the stud wall that extends inward from the first end of the stud wall toward the opposing stud wall at an acute angle to the longitudinal axis of the stud wall, a second portion of the stud wall extends from the first portion of the stud wall to a third portion of the stud wall that is perpendicular to the stud web, the second portion of the stud wall being at an obtuse angle to the third portion of the stud wall for engagement with the retaining first portion of said plate wall of the metal plate member.

2. The metal plate member and the metal stud member according to claim 1, wherein the metal stud member is telescopic.

* * * * *